F. L. O. WADSWORTH.
GLASS WORKING MACHINE.
APPLICATION FILED JUNE 27, 1918.

1,333,143.

Patented Mar. 9, 1920.
2 SHEETS—SHEET 1.

Witness
Frank A. Sable

Inventor
Frank L. O. Wadsworth,
By Hood & Schley
Attorneys

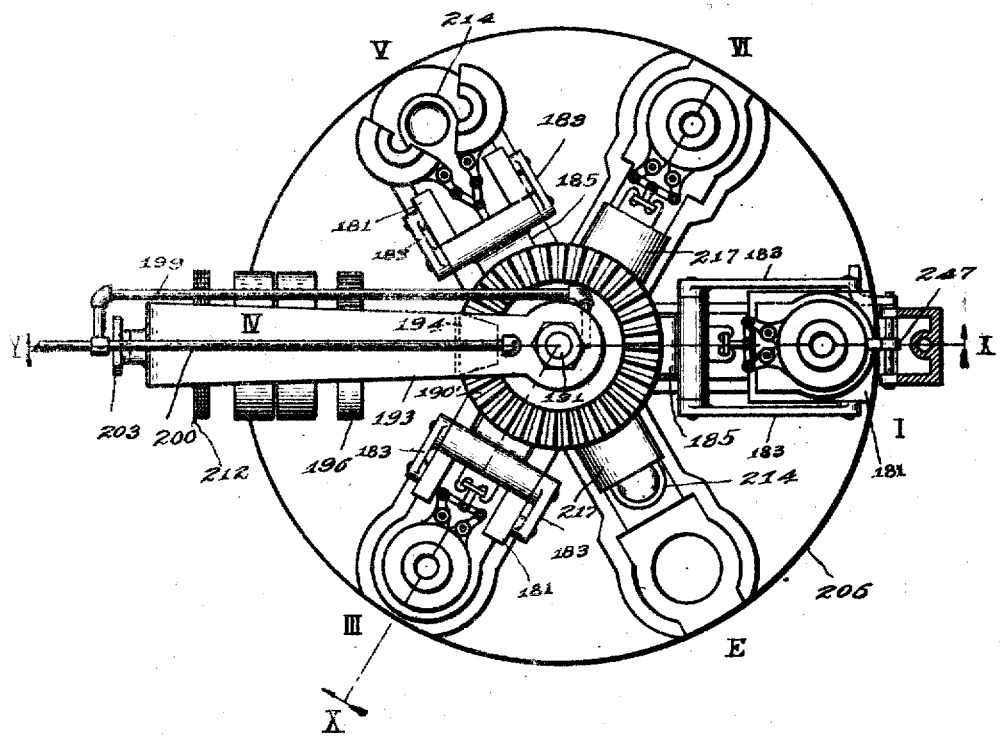

UNITED STATES PATENT OFFICE.

FRANK L. O. WADSWORTH, OF PITTSBURGH, PENNSYLVANIA, ASSIGNOR TO BALL BROTHERS GLASS MANUFACTURING COMPANY, OF MUNCIE, INDIANA, A CORPORATION OF INDIANA.

GLASS-WORKING MACHINE.

1,333,143.

Specification of Letters Patent.

Patented Mar. 9, 1920.

Original application filed April 24, 1914, Serial No. 834,233. Divided and this application filed June 27, 1918. Serial No. 242,263.

*To all whom it may concern:*

Be it known that I, FRANK L. O. WADSWORTH, a citizen of the United States, residing at Pittsburgh, in the county of Allegheny and State of Pennsylvania, have invented a new and useful Glass-Working Machine, of which the following is a specification.

The object of my invention is to produce a machine for working glass, of such character as to be especially available for receiving successive charges of molten glass from a downwardly-flowing stream.

The present application is a division from application Serial No. 834,233, filed April 24, 1914.

Figure 1:
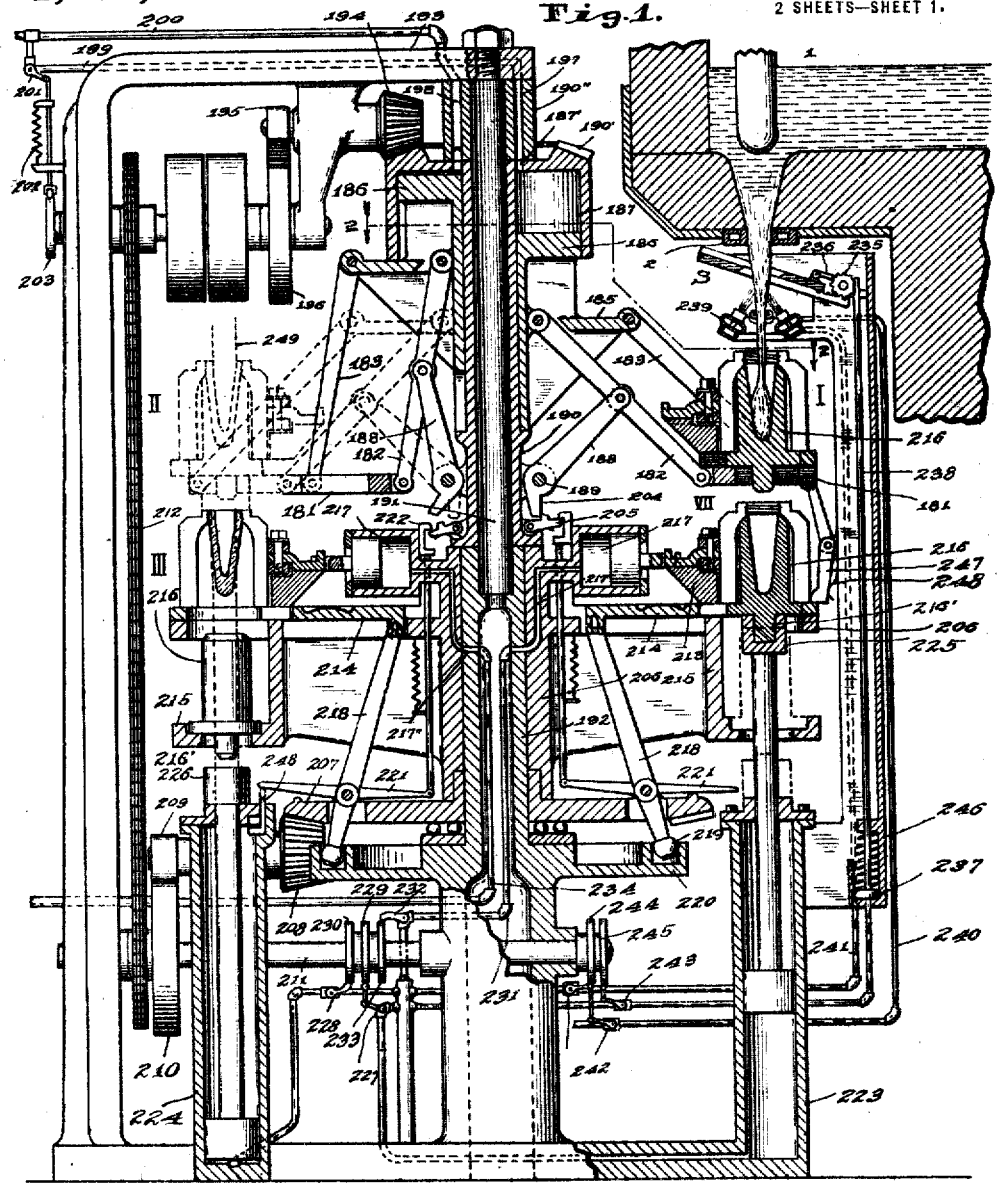
Figure 2:
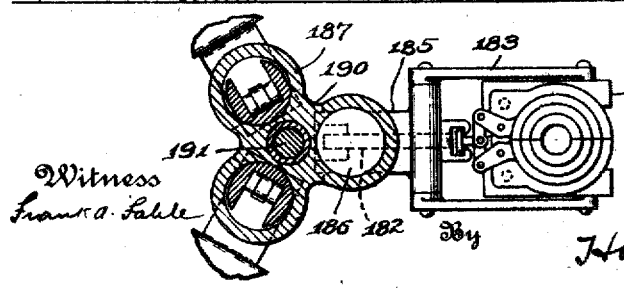

The accompanying drawings illustrate my invention. Figure 1 is a vertical section of a machine embodying my invention, the section being taken on lines 1—1 and X—Y of Fig. 3, and the view also showing a fragmentary vertical section of a furnace or other supply of molten glass delivering a downwardly-flowing stream; Fig. 2 is a section on line 2—2 of Fig. 1; and Fig. 3 is a plan with the shearing and stream-heating mechanism cut away.

The drawings illustrate a machine which is particularly adapted for the production of vitreous articles by a combined pressing and blowing operation, in which a hot blank, or parison, is first formed in one mold by a press plunger and is then blown to final form in another mold by air pressure, provision being made for cutting the flowing stream of glass into successive charges and for locally externally heating the freshly cut end before it is allowed to proceed to the next mold.

In the drawings, 2 indicates the delivery orifice in the bottom of a supply chamber 1, from which the glass flows in a stream to the blank, or parison molds 216, as they are brought successively to the charging position to receive it. While in the charging position, the receiving receptacle is supported on the U-shaped table, or platen, 181, which is pivotally supported on the lower ends of three links 182, 183 and 183, the upper ends of which are mounted on a vertically movable frame 185 carried by a piston 186 in the cylinder 187. Pivoted to the middle of link 182 is a lever 188, the lower end of which is pivoted at 189 on the frame 190 which carries the cylinder body 187 and the guides for the frames 185. The movable parts just described constitute the elements of a parallel motion straight-line linkage, which moves the table or platen 181 horizontally when the piston 186 is raised or lowered.

The frame 190 is rotatably mounted on a central spindle 191 which is supported at its lower end in the upper end of a spindle or stud 192, and at its upper end by an overhanging arm 193 forming part of the main frame of the machine. Frame 190 carries three sets of platen-supporting and actuating parts, such as have been described above, arranged at an angle of 120 degrees to each other (see Fig. 2), two of these sets of parts being shown in the 120 degree angle section of Fig. 1. At the upper end of frame 190 is a bevel gear 190′ which is engaged and rotated by a bevel pinion 194. Pinion 194 is mounted on a short shaft which is journaled in the main frame of the machine and carries at its other end an interrupted-toothed pinion 195 which is driven by a larger interrupted-toothed gear 196, these gears being of a well-known form for intermittent movement of pinion 195 as a result of continuous movement of gear 196. The train of gears 196, 195, 194 and 190′ is so proportioned as to move head 190 through one-third of a rotation at each engagement of the toothed portions of the gears 195 and 196, and these two gears are so proportioned as to make the intervals of rest about three times as long as the intervals of movement.

The upper face of the bevel gear 190′ is covered by a cap 190″ which contains two port openings 197 and 198 in communication, respectively, with the pipes 199 and 200 leading to a pressure apparatus and a vacuum tank or exhaust apparatus, respectively. The port 197 is a short one and the port 198 is a long one, extending almost around the cap and separated at its two ends from the short port 197 by only narrow bridge walls. The pipe section 199 contains a three-way valve 201 which is controlled in its movements by a spring 202 and a cam 203 on the main driving shaft of the machine. The hub of the gear 190′ is pierced with three openings 187′ which lead to the cylinders 187. Ports 187' come successively into registry with the short port 197 when the platens or tables 181 are in the position I, and are successively in registry with the long port 198 at all other times. Each lever 188 of the parallel link support of the platens is provided with a dog 204 which is engaged and held by a latch 205 when the platens are extended under the molds.

Below the head 190, and coaxial therewith, upon the stem 192, is a second rotary table or head 206 which is moved intermittently through one-sixth of a revolution by the bevel gears 207 and 208, gear 208 being driven by a mutilated gear 209 driven by a companion mutilated gear 210. Gear 210 is mounted on a shaft 211 which is rotated constantly and synchronously with the main power shaft of the machine by a chain, or other positive driving connection, 212. The lower table 206 has suitable guide mountings such as are indicated at E, Fig. 3, for receiving the side and bottom members 213 and 214 of the blow molds, and is also provided with downwardly-extended bracket supports 215 for receiving and supporting the parison molds 216 when the latter are withdrawn from the blow molds after the parison blank has been pressed to form, as indicated at positions II and III at the left of Fig. 1. This lower table support may also be provided with cylinder and piston members 217, 217, etc., for opening and closing the side members 213 of the blow molds; the connection between the piston rods and the actuating linkage for the mold parts being of such a character as to be readily disengaged and rearranged without disturbing the position of the parts when the molds are lifted or lowered, as clearly indicated in Fig. 2.

The table 206 is also provided with means for actuating the bottom members 214 of the molds, these means consisting of levers 218 which are pivoted on the bevel gear 207 and carry at their lower ends rollers 219 engaged in the fixed cam track 220 on the main frame of the machine. Gear 207 also carries a series of independently pivoted levers 221, one for each mold mounting, whose inner ends are connected to rods that are provided at their upper ends with forked heads 222 which engage at proper times with the ends of the latches 205.

Carried on the main frame of the machine are two cylinders 223 and 224, which are located respectively in vertical alinement with the positions occupied by the molds in positions VII—I, and II—III (Figs. 1 and 3). The pistons of these cylinders carry heads 225 and 226, respectively, which are recessed to engage with the downwardly projecting lugs 216' of the parison molds 216. The pistons and heads carried thereby are actuated by compressed air or steam introduced to the cylinders 223 and 224 through valves 227 and 228 controlled by cams 229 and 230, respectively, on shaft 211.

A pipe 231 leads from the compressed air main through the hollow base of the central standard 192 to a port in the side of that standard and this port is in successive registry with passageways 217' leading to each cylinder 217, when the latter is in position VI (see Fig. 3). The flow of air through this pipe 231 may also, if desired, be further controlled by a valve 232 operated by a cam 233 on shaft 211. A fourth pipe 234 leads from a vacuum tank or air exhaust pump to a second port 217'' in the face of the hollow standard 192 which port registers successively with the passageways 217' when the mold reaches the position V (Fig. 3).

The main frame of the machine also carries a stream-severing device S which is shown as similar in its operation to that shown and described in my copending application, Serial No. 834,232. It consists of two reciprocating shear blades which are moved simultaneously at different speeds by the pinion crank disk 235 and connecting rod 236, these parts being actuated by the piston 237 and the piston rack rod 238. Below the shear blades there is a blast ring burner 239 to which gas and compressed air are supplied through pipes 240 and 241. The flow of fluid through these pipes and also to the cylinder containing the piston 237, is controlled by valves 242 and 243 actuated by cams 244 and 245 on shaft 211. Arranged at position VII is a pawl or catch 247 which is normally held projected by a spring 248 in position to engage a projected portion of each parison mold 216 as it is brought up by piston head 225 and arrest the upward movement of this head at an intermediate point. This catch is provided with a portion which is extended upwardly in a position to be engaged by each platen 181 as it passes away from the charging position I (Fig. 1).

The operation is as follows:

When the parts are in position shown in Figs. 1 and 3, there is a mold supported in the charging position I on a platen 181 of the upper table 190 and also molds in positions III, IV, V, VI and VII on the lower table 206, position E in the table being empty. When the mold at I has been charged with the requisite quantity of glass, the valve 243 is opened momentarily by cam 245, thus admitting air to the cylinder containing the piston 237 and closing the shear blades which are immediately opened again by the spring 246. Simultaneously with this opening movement, the valves 242 are actuated by the cam 244 to admit an increased flow of gas and supply of compressed air to the burner 239 to form a hot blast jet support for the severed end of the stream of glass, depending from the orifice 2. At the instant of closing the shear blades, the toothed portions of the gears 195 and 196 are brought into engagement and the upper table frame or support 190 is set in rotation so as to carry the filled mold from position I toward position II. As the platen 181 carrying this mold moves away from the charging position, it engages with catch 247 so as to release the catch and permit head 225, which has already been raised to the half-way position, shown in the drawings, by the previous opening of the valve 227, to rise and lift the mold parts carried thereby away from the lower table support to the charging position. The continued forward movement of the upper table 190 carries the filled mold to position II in which position it is still supported on its extended platen 181. Just before the mold has reached this position, valve 228 is opened by cam 230 and the head 226 is raised to engagement with the downwardly projecting boss of the filled parison mold 216; the table and piston movements being so timed as to bring the table to rest just the instant before the head 226 engages the mold and lifts it as a whole off the platen support 181. Simultaneously with this last movement, the outer end of the lever 221 is lifted by the contact of the piston with the pin block 248 and the lock 205 is thereby withdrawn from engagement with the dog 204. This permits the platen-supporting frame 185 to be lifted by the external pressure of the air on piston 186, the air having been withdrawn from behind this piston through the port 198 and pipe 200, thus withdrawing the platen 181 from under the mold now carried by the elevated head 226. Simultaneously with this last operation, the plunger 249 is brought down on the unformed mass of glass in the mold 216 (the common press plunger mechanism is not shown in these drawings) and forms the parison blank and neck of the article in the usual well-known manner. During this pressing operation, the mold is elastically supported on the cushion of compressed air in cylinder 224 and by properly regulating the pressure therein, by means of the valve 228, exactly the right degree of pressure may be applied to the glass in the parison blank. As soon as the press operation is completed, the three-way valve 228 is brought to discharge position by the cam 230 and the piston carrying the head 226 and the mold parts supported thereon, descends, first lowering the outer blow mold frame 213 to position III on the upper surface of the lower table 206 (between the guide mountings shown at E, Fig. 3) and then, on its further descent, withdrawing the parison mold 216 from the formed blank (which remains suspended in the neck ring of the blow mold) and lowering it in turn until it rests on the bracket support 215.

The rotation of the upper frame 190, which carries the filled mold from the position I to position II, brings the succeeding platen-support 181, in its retracted position, opposite the mold which has just been lifted to the charging position I. In this position, the entry or port to the corresponding cylinder 187 is in registry with the short port 197 which is at the end of the pipe 199. The three-way valve 201 is now moved by the cam 203 to open position, thus shutting off communication with the exhaust apparatus and permitting air to pass to the back of the piston 186. The frame 185 then descends under the action of gravity (or, if desired, it may be forced down by a positive air pressure) and moves the platen 181 forward under the mold, as shown at the right of Fig. 1. The three-way valve 227 is then moved to discharge or exhaust position by the cam 229, thus permitting the air to escape from the cylinder 223 and allowing the piston-carrying head 225 to drop to its lowest position corresponding to the position in which the piston and head 226 are shown in Fig. 1.

The pistons and heads 225 and 226 having now both been dropped to their lowest position, free from engagement with all mold and table parts, the toothed portions of the gears 209 and 210 are engaged and the lower table 206 is rotated through one-sixth of a revolution, thereby advancing all of the molds on said table one step forward. As the mold containing the pressed parison 250 is moved from position III to position IV, the corresponding bottom plate 214 is slid into place by the engagement of the roller 219 with an inwardly-inclined portion of the cam track 220 and at the position IV the pressed parison is blown to shape in the usual manner. The mold which was formerly in the position IV is moved to position V and at that point it is opened by the withdrawal of air from the cylinder 217 through the exhaust pipe 234. The mold which is in position V is moved to position VI and is there closed by the admission of compressed air to the corresponding cylinder 217 through the pipe 231 and valve 232. The mold at position VI is carried to position VII, where it is just below the mold being filled with glass. As soon as the lower mold table has been brought to rest, the valve 227 is again opened, thus lifting the head 225 into engagement with the parison mold on the lower track support 215 and raising this until it enters the empty blow mold at position VII. It is held at this point against further movement by the lock 247 until the mold at position I, on the top table, is moved away from that position in the beginning of a new cycle of operation.

Those skilled in the art will readily understand that the drawings do not show all of the details of construction which would be employed in making a working machine. No details of the pressing mechanism or of the blowing mechanism are shown and various other details of like nature, which can be readily supplied by any skilled mechanic familiar with this class of glass working machine, have likewise been omitted.

I claim as my invention:

1. A glass working machine comprising a horizontally rotatable table, a plurality of receptacles removably mounted on said table, a plurality of shifter members arranged above the table to receive independent molds and movable laterally independent of the table, an elevator arranged below the table to lift the receptacles successively from the table to one of the shifter members, and a detruder arranged below the table to lower the receptacles from a shifting member to the table.

2. A glass working machine comprising a horizontally rotatable table, a plurality of receptacles removably mounted on said table, an elevator arranged below the table at a charging station and adapted to successively engage the receptacles and lift them in the charging line, an independently rotatable laterally movable receptacle carrier arranged above the table to receive the receptacles from the elevator, a detruder arranged to receive receptacles from said carrier and lower the same to the table, means for intermittently advancing the table, and means for intermittently advancing the shifter member and for shifting the same into and out of engagement with the receptacles.

3. A glass working machine comprising a horizontally rotatable table, a plurality of parison molds removably carried by said table, a plurality of blow molds removably carried by the table, an elevator arranged in the charging line and adapted to successively engage the parison molds in the charging line and lift them first into the blow mold and then to lift the parison mold and blow mold together from the table, a shifter member arranged above the table and adapted to be moved first into position to receive a parison mold and blow mold from the elevator at the charging point, to then shift the molds from the charging point and relative to the rotary table and to thereafter withdraw from the molds, a detruder arranged to receive the molds from the shifter member and to lower the same to the rotary table and to retract the parison mold from the blow mold, and timing means for automatically controlling the movements of the several parts.

4. A glass working machine comprising a horizontally rotatable table, a plurality of parison molds removably carried by said table, a plurality of blow molds removably carried by the table, an elevator arranged in the charging line and adapted to successively engage the parison molds in the charging line and lift them first into the blow mold and then to lift the parison mold and blow mold together from the table, a shifter member arranged above the table and adapted to be moved first into position to receive a parison mold and blow mold from the elevator at the charging point, to then shift the molds from the charging point and relative to the rotary table and to thereafter withdraw from the molds, a detruder arranged to receive the molds from the shifter member and to lower the same to the rotary table, and timing means for automatically controlling the movements of the several parts.

5. A glass working machine comprising a horizontally rotatable table, a plurality of parison molds removably carried by said table, a plurality of blow molds removably carried by the table, an elevator arranged in the charging line and adapted to successively engage the parison molds in the charging line and lift them first into the blow mold and then to lift the parison mol and blow mold together from the table, a shifter member arranged above the table and adapted to be moved first into position to receive a parison mold and blow mold from the elevator at the charging point, to then shift the molds from the charging point and relative to the rotary table and to thereafter withdraw from the molds, and a detruder arranged to receive the molds from the shifter member and to lower the same to the rotary table and to retract the parison mold from the blow mold.

6. A glass working machine comprising a horizontally rotatable table, a plurality of parison molds removably carried by said table, a plurality of blow molds removably carried by the table, an elevator arranged in the charging line and adapted to successively engage the parison molds in the charging line and lift them first into the blow mold and then to lift the parison mold and blow mold together from the table, a shifter member arranged above the table and adapted to be moved first into position to receive a parison mold and blow mold from the elevator at the charging point, to then shift the molds from the charging point and relative to the rotary table and to thereafter withdraw from the molds, and a detruder arranged to receive the molds from the shifter member and to lower the same to the rotary table.

7. A glass working machine comprising a horizontally rotatable table, a plurality of receptacles removably mounted on said table, a coaxial rotary carrier arranged above the table and provided with a plurality of radially shiftable platens, an elevator arranged to successively engage the receptacles of the table and raise them in the charging line from the table, means for radially shifting the platens to a position beneath the raised receptacle, means for rotating the rotary carrier independent of the table, and a detruder arranged to receive receptacles successively from the platens and to lower them to the rotary table.

8. A glass working machine comprising a horizontally rotatable table, a plurality of receptacles removably mounted on said table, a coaxial rotary carrier arranged above the table and provided with a plurality of radially shiftable platens, an elevator arranged to successively engage the receptacles of the table and raise them in the charging line from the table, means for radially shifting the platens to a position beneath the raised receptacles, means for rotating the rotary carrier, and a detruder arranged to receive receptacles successively from the platens and to lower them to the rotary table.

In witness whereof I have hereunto set my hand at Pittsburgh, Pennsylvania, this eighteenth day of June, A. D. one thousand nine hundred and eighteen.

FRANK L. O. WADSWORTH.